United States Patent Office 3,733,399
Patented May 15, 1973

3,733,399
ORAL COMPOSITIONS CONTAINING AN ENZYME
Joseph Gerald Becker, Martinsville, Robert Lee Mitchell, Somerset, and William Grant Pierson, Irvington, N.J., assignors to Colgate-Palmolive Company, New York, N.Y.
No Drawing. Continuation-in-part of application Ser. No. 23,467, Mar. 27, 1970, which is a continuation-in-part of application Ser. No. 864,212, Oct. 6, 1969, now abandoned. This application Jan. 14, 1972, Ser. No. 217,940
Int. Cl. A61k 7/16
U.S. Cl. 424—50                13 Claims

ABSTRACT OF THE DISCLOSURE

Toothpaste compositions which contain as the active ingredient, the enzyme invertase.

---

This application is a continuation-in-part of U.S. Ser. No. 23,467, filed Mar. 27, 1970, and now abandoned which is a continuation-in-part of U.S. Ser. No. 864,212, filed Oct. 6, 1969, and now abandoned.

The present invention relates to improvements in oral and dental hygiene. More specifically, the invention relates to compositions in the form of toothpastes containing invertase, which is capable of inhibiting the formation of dental plaque and which maintains its activity when formulated into aqueous compositions. In the past few years the problems of dental hygiene have commanded more and more attention; much progress has been made in the field; however, the problems associated with dental hygiene and tooth decay are numerous and complex. Therefore, there is an ever increasing demand for dental compositions designed to control and alleviate these problems.

The present invention is drawn to improved oral hygiene and the prevention of the formation of dental plaque, which forms on teeth as a precursor to caries and calculus formation.

There are several ways of removing plaque from teeth. Among them enzymes such as pepsin, amylopsin, trypsin, and steapsin have been used to assist in the removal of food particles from the teeth, but they have been found to be ineffective in preventing the formation of plaque. Other enzymes including those formed from micro-organisms Aspergillus oryzae and A. niger have also been used but have not been satisfactory in preventing the formation of plaque.

The dentifrices containing proteolytic enzymes are designed to catalyze the digestion of the organic matrix within which plaque develops. However, these proteolytic enzyme-containing dentifrices are rather unstable, and the enzymatic activity diminishes quickly. Moreover, the enzymes have a low degree of activity and thus must be used in high concentration and for substantial time intervals each day. More specifically, most enzymes are generally quite unstable in aqueous preparation. However, it has been found that invertase can be formulated into dental preparations containing substantial amounts of water. These invertase compositions maintain a high degree of activity and have a contact time low enough to be suitable for daily dental hygiene. The fact that invertase can be incorporated successfully into such compositions is highly unexpected and unpredictable.

This invention advantageously provides novel enzymatic compositions which improve oral hygiene and have a prophylatic effect on dental plaque formation.

A further advantage is that compositions are provided which inhibit the formation of dental plaque when used in ordinary dental hygienic procedures.

Another advantage of this invention is that invertase is formulated into aqueous compositions and still maintains a high degree of activity.

Another advantage is that toothpaste compositions which contain no protease are provided which inhibit the formation of dental plaque, but are not harmful to dental surfaces, tissue proteins, or salivary secretions.

Another advantage is that the enzyme employed is available from more than one source.

Other advantages and improvements will become apparent from the following specification.

In general, this invention comprises oral hygienic compositions which contain an effective amount of invertase of at least about 2000 activity units/mg. of nitrogen.

Typically, for reasons of economy invertase is employed in the oral preparations of this invention in an effective amount of at least about 0.05% up to about 0.5%. Effective preparations of invertase have an activity of at least 2000 A.U./mg. N and again for reasons of economy, generally up to about 6000 A.U./mg. N. Preferably, the activity level is about 4000 A.U./mg. N.

Invertase can be prepared from several sources at a satisfactory activity level for use in the instant invention.

Invertase is obtained from Baker's yeast in the following manner. [For any additionally desired information see "Purification de l'Invertase de lavure," E. H. Fischer et L. Kohtes, Helvetica Chimica Acta, 34, p. 1123 (1951)]. The yeast cells are plasmolyzed in toluene at pH 5.0 to 7.5 allowing autolysis of the cells and release of the invertase. This crude extract is cooled and acidified with 0.35 volume of picric acid per volume of crude extract to precipitate some of the undesirable components of the extract. The slurry is centrifuged and the precipitate discarded. Three volumes of acetone per volume of supernatant are added to precipitate additional undesirable components. The slurry is allowed to settle, and the supernatant is decanted. The supernatant is then dialyzed against cold water. Aluminum hydroxide at pH 6.0 is added to the dialyzed solution in an amount of about 1 milligram per 12 to 36 activity units of the dialyzed solution. The invertase is allowed to absorb on the $Al(OH)_3$ for 3 minutes at 0° C., and the slurry is then centrifuged for 3 minutes. The supernatant is discarded. The precipitate is suspended in a minimum amount of water by shaking in a Vibromischer, and the pH of the slurry is adjusted to 2.9 using a 4 N ammonium lactate-lactic acid buffering system in an amount of 5 milliliters of buffer per gram of $Al(OH)_3$. The slurry is centrifuged, and the supernatant is decanted and adjusted to 4.8 (precipitate is discarded). The invertase is precipitated with 3.5 volumes of acetone per volume of supernatant. The precipitate is resuspended in water and its activity checked. The invertase is further purified by again adding $Al(OH)_3$ as before and repeating all of the subsequent steps set forth above.

The activity of invertase is determined by the colorimetric method of Sumner using dinitro-salicylic acid to measure the reducing sugars [See J. B. Sumner and S. F. Howell, Journal of Biological Chemistry, 108, p. 51 (1935)]. The activity unit for invertase is defined as that quantity of the enzyme which will liberate 1 milligram of reducing sugar in 3 minutes at 20° C. and a pH of 4.8 in a 5-percent sucrose solution. The activity of the invertase prepared by this method is about 4000 A.U./mg. N; at this activity about 0.05- to 0.5-percent invertase is incorporated into the instant oral compositions, in general.

The ensyme preparation can also be obtained from Aspergillus oryzae in the following manner. Roux bottles containing 70 to 100 milliliters of Czapek-Dox medium (5-percent sucrose, 0.2-percent $NaNO_3$, 0.1-percent $K_2HPO_4$, 0.05-percent $MgSO_4.7H_2O$, 0.05-percent KCl, 0.001-percent $FeSO_4.7H_2O$) are inoculated with spores and incubated at 30° C. Mycelial felts are usually harvested within 8 days of inoculation, before the beginning of active sporulation. When spores are required, the mould is grown for 1 to 3 weeks on a solid medium (as above, with the addition of 2-percent agar) and the spores washed off with water.

The material is frozen and crushed in a press cooled by contact with solid $CO_2$, the product being a mobile fluid (20° C.) which still contains a few viable cells, indicated by the fact that a little growth occurs if the material is stored for 2 or 3 days without $CHCl_3$ or toluene. The suspension is centrifuged and the supernatant liquid dialyzed for 2 days in the presence of toluene against running tap water, the dialysis being carried out in Visking synthetic cellulose casing. A flocculent precipitate usually develops during dialysis: this is removed by filtration to give a clear, slightly colored extract. The extract is filtered under suction, dialyzed as above and filtered a second time.

Invertase is prepared and marketed by numerous manufacturers such as that sold under the name Invertase (analytical grade, K value 15, AOAC method, equivalent to about 3200 activity units/mg. N) by the Mann Research Laboratory, New York, N.Y.

It has been found that invertase is capable of improving oral hygiene and preventing the formation of dental plaque on teeth. The mechanism of plaque formation is not known, therefore, it is to be understood that the theoretical considerations expressed here are not considered binding. Dental plaque is believed to form on teeth including dentures through the formation of dextran-like polysaccharides which are synthesized by bacteria from the disaccharide sucrose. Since bacteria cannot produce these dextran-type polysaccharides from glucose and/or fructose, the monosaccharide components of sucrose, the prevention of the formation of dental plaque can be accomplished by breaking down the sucrose into glucose and fructose. Once the sucrose has been broken down into its monosaccharide components, there is no longer a suitable substrate for the bacteria to utilize, therefore, there is no plaque formation.

It has been found that invertase when incorporated into hygienic compositions will compete with the polysaccharide-forming microorganisms for available sucrose. Invertase, by its hydrolytic conversion of sucrose to glucose and fructose, substantially reduces the sucrose available to the bacteria for use in the synthesis of dextran, and thus prevents the formation of plaque under in vitro conditions as well as on teeth.

Invertase may be utilized in various toothpaste preparations. These preparations may contain various adjuvants in suitable amounts provided these adjuvants do not substantially adversely affect the desired results.

The instant toothpaste compositions normally have a pH from about 5 to 9 and preferably from about 6 to 7. If desired, the pH may be maintained with a buffering system.

When the carrier material is a toothpaste, there is present therein a substantially water-insoluble polishing agent. Representative materials include, for example, dicalcium phosphate, tricalcium phosphate, insoluble sodium metaphosphate, aluminum hydroxide, magnesium carbonate, calcium carbonate, calcium pyrophosphate, calcium metaphosphate, calcium sulfate, polymethylmethacrylate, bentonite, etc., and suitable mixtures thereof. Abrasive resinous substances as the condensation products of melamine and urea with formaldehyde can also be used. It is preferred to use the water-insoluble phosphate salts as the polishing agents and more particularly, insoluble sodium metaphosphate and/or a calcium phosphate, such as dicalcium phosphate dihydrate. Typically, other ingredients are present in the carrier and the amount of polishing agent is up to about 75 percent of the carrier. The polishing agent is generally about 20 to 75 percent of the carrier.

In toothpaste formulations, the liquids and solids should necessarily be proportioned to form a creamy mass having the desired consistency which is extrudable from a pressurized container or a collapsible tube (for example, aluminum or lead). In general, the liquids in the toothpaste will comprise chiefly water, glycerine, aqueous solutions or sorbitol, propylene glycol, polyethylene glycol 400, etc., and suitable mixtures thereof. It is advantageous usually to use a mixture of both water and a humectant or binder such as glycerine or sorbitol. The total liquid content will generally be about 20 to 75 percent of the carrier. Water is typically present as is indicated in the illustrative example below. It is preferred to use also a gelling agent in toothpastes such as the natural and synthetic gums and gum-like materials such as Irish moss, gum tragacanth, sodium carboxymethyl cellulose, polyvinylpyrrolidone, starch, and the like, usually in an amount up to about 10 percent, and preferably about 0.2 to 5 percent, of the carrier.

An organic surface-active agent may be used in the carrier of the present invention to assist in achieving thorough and complete dispersion of the instant compositions throughout the oral cavity and to render the instant compositions more cosmetically acceptable. The organic surface-active material may be anionic or nonionic in nature; it is preferred to employ as the surface-active agent a detersive material which imparts to the composition detersive and foaming properties. Suitable detergents are water-soluble salts of higher fatty acid monoglyceride monosulfates, such as the sodium salt of the monosulfated monoglyceride of hydrogenated coconut oil fatty acids; higher alkyl sulfates, alkyl aryl sulfonates; higher alkyl sulfoacetates; higher fatty acid ester of 1,2-dihydroxy propane sulfonates; higher fatty acid amides of taurine; higher fatty acid esters of isothionic acid; and the substantially saturated higher aliphatic acyl amides of lower aliphatic aminocarboxylic acid compounds, such as those having 12 to 16 carbons in the fatty acid, alkyl, or acyl radicals, and the like. Examples of the last mentioned amides are N-lauroyl sarcosine, and the sodium, potassium and ethanolamine salts of N-lauroyl, N-myristoyl, or N-palmitoyl sarcosinates, which should be substantially free from soap or similar higher fatty acid material which tend to substantially reduce the effect of the sarcosines and sarcosinates. The use of these sarcosinate compounds in dentifrice compositions of the present invention is particularly advantageous since these materials exhibit a prolonged and marked effect on the inhibition of acid in the oral cavity due to carbohydrates and help reduce the solubility of tooth enamel in acid solutions.

Other suitable surface-active materials include nonionic agents such as condensates of sorbitan monostearate with approximately 60 moles of ethylene oxide, condensates of propylene glycol ("Pluronics") condensates of higher fatty alcohols such as tridecyl alcohol with ethylene oxide, condensates of alkyl thiophenols with 10 to 15 ethylene oxide units, and ethylene oxide addends of monoesters of hexahydric alcohols and inner esters thereof such as sorbitan monolaurate, sorbitol mono-oleate, and mannitan monopalmitate.

It is preferred to use the surface-active agent in amount of about 0.05 to 5 percent of the carrier.

Various other materials may also be incorporated into the carrier. Examples thereof are coloring or whitening agents (for example, titanium dioxide), preservatives (for example, sodium benzoate), silicones, chlorophyll compounds, ammoniated materials such as urea, diammonium phosphate, and mixtures thereof, saccharine, alcohol, menthol, and other constituents. These adjuvants are incorporated into the instant compositions in amounts which do not substantially adversely affect the properties and characteristics suitably selected and used in proper amount depending upon the particular type of preparations involved.

It may be desirable also to include antibacterial agents in the carrier, typically in an amount of about 0.01 to 5 percent, preferably about 0.05 to 1.0 percent of the carrier. Typical antibacterial agents include the bis-phenols and bis-biguanides such as:

p-chlorophenyl biguanide;
4-chlorobenzhydryl biguanide;
4-chlorobenzhydrylguanylurea;
1,6-di-p-chlorophenylbiguanidohexane;
5,6-dichloro-2-guanidinobenzimidazole;
5-amino-1,3-bis(2-ethylhexyl)-5-methylhexahydropyrimidine;
2,2'-dihydroxy-3,5,6,3',5',6'-hexachlorodiphenylmethane;
2,2'-dihydroxy-5,5'-dichlorodiphenylmethane
and their nontoxic acid addition salts.

Flavoring or sweetening materials of the type commonly employed in dentifrices may be included in the carrier. Such materials, if present, aid in modifying the particular tastes of the flavor in the manner desired. Examples of such additional materials include the flavoring oils, for example, oils of spearmint, wintergreen, sassafras, clove, sage, eucalyptus, marjoram, cinnamon, lemon, and orange, as well as sodium methylsalicylate. Suitable sweetening agents include sucrose, lactose, maltose, sorbitol, sodium cyclamate, and saccharine. Suitably, the flavor and sweetening agent may together comprise about 0.01 to 2.0 percent of the carrier.

The carrier suitably may contain a fluorine-containing compound having a beneficial effect on the care and hygiene of the oral cavity, for example, diminution of enamel solubility in acid and protection of the teeth against decay. Examples thereof include sodium fluoride, stannous fluoride, potassium fluoride, potassium stannous fluoride ($SnF_2 \cdot KF$), fluorosirconate, and sodium monofluorophosphate. These materials, which dissociate or release fluorine containing ions in water, suitably may be present in the carrier in an effective but nontoxic amount, usually within the range of about 0.01 to 1 percent of the water-soluble fluorine content thereof.

The following specific example is further illustrative of the nature of the present invention, but it is to be understood that the invention is not limited thereto. The amounts and proportions in the specification and examples are by weight unless otherwise indicated.

EXAMPLE 1

The following toothpastes are prepared to improve oral hygiene and inhibit the formation of dental plaque:

| Components | Parts A | Parts B | Parts C |
|---|---|---|---|
| Glycerine | 25.7 | 28.5 | 25.1 |
| Carboxymethyl cellulose | 0.75 | | |
| Irish moss | | 1.3 | 1.3 |
| Tetrasodium pyrophosphate | 0.3 | | 0.2 |
| Sodium benzoate | 0.5 | 0.2 | 0.5 |
| Saccharine | | | 0.2 |
| Water | 20.0 | 22.0 | 19.0 |
| Sodium N-lauroyl sarcosinate | 1.0 | 1.5 | 1.0 |
| Dicalcium phosphate | 46.7 | 15.0 | 46.7 |
| Calcium carbonate | 5.0 | | 5.0 |
| Insoluble sodium metaphosphate | | 30.6 | |
| Color | | 0.4 | |
| Invertase | 0.05 | 0.5 | 1.0 |

What is claimed is:

1. A toothpaste preparation comprising a polishing agent, a liquid vehicle including water in which said polishing agent is suspended, and at least about 0.05% by weight invertase having an activity of at least about 2000 A.U./mg. N.

2. The toothpaste preparation claimed in claim 1 wherein said invertase is the sole active enzyme and is present in a pure state.

3. The toothpaste preparation claimed in claim 1 wherein invertase is present in amount of about 0.05–0.5% and has an activity of about 2000 A.U./mg. N–6000 A.U./mg. N.

4. The toothpaste preparation claimed in claim 3 wherein invertase has an activity of about 4000 A.U./mg. N.

5. The toothpaste preparation claimed in claim 1 wherein said polishing agent is present in an amount of about 20–75% by weight.

6. The toothpaste preparation claimed in claim 5 wherein said liquid is present in an amount of about 20–75% by weight of a liquid vehicle and said preparation also contains about 0.2–10% by weight of a gelling agent and about 0.05–5% by weight of a water-soluble organic detergent.

7. The toothpaste preparation claimed in claim 6 in which said water-soluble organic detergent is selected from the group consisting of sodium N-lauroyl sarcosinate and sodium lauryl sulfate.

8. The toothpaste preparation claimed in claim 6 wherein said polishing agent is selected from the group consisting of dicalcium phosphate, insoluble sodium metaphosphate and calcium carbonate.

9. The toothpaste preparation claimed in claim 6 which also contains about 0.01 to 1% by weight of a fluorine-containing compound selected from the group consisting of stannous fluoride, sodium fluoride, and sodium monofluorophosphate.

10. The toothpaste preparation claimed in claim 9 wherein said invertase is present in amount of about 0.05–0.5% by weight and has an activity of about 2000 A.U./mg. N–6000 A.U./mg. N.

11. The toothpaste preparation claimed in claim 10 wherein said invertase has an activity of about 4000 A.U./mg. N.

12. A process for improving oral hygiene which comprises applying to the oral cavity a toothpaste preparation containing at least about 0.05% by weight invertase having an activity of at least about 2000 A.U./mg. N.

13. The process for improving oral hygiene claimed in claim 12 wherein said invertase is present in an amount of about 0.05–0.5% by weight and has an activity of about 2000 A.U./mg. N–6000 A.U./mg. N.

References Cited

FOREIGN PATENTS 2,028,285  12/1970  Germany _____ 424—50

RICHARD L. HUFF, Primary Examiner

U.S. Cl. X.R.

424—52, 54, 56, 57

Notice of Adverse Decision in Interference

In Interference No. 98,611, involving Patent No. 3,733,399, J. G. Becker, R. L. Mitchell and W. G. Pierson, ORAL COMPOSITIONS CONTAINING AN ENZYME, final judgment adverse to the patentees was rendered Oct. 4, 1977, as to claims 1, 2, 5, 6 and 12.

[*Official Gazette February 14, 1978.*]